(No Model.) 2 Sheets—Sheet 1.

L. SMITH.
DRIVE PIPE AND COUPLING FOR OIL AND OTHER WELLS.

No. 255,469. Patented Mar. 28, 1882.

Witnesses:

Levi Smith
Inventor.

(No Model.) 2 Sheets—Sheet 2.

L. SMITH.
DRIVE PIPE AND COUPLING FOR OIL AND OTHER WELLS.

No. 255,469. Patented Mar. 28, 1882.

Witnesses:
M. G. Cushing
Will Kimble

Inventor:
Levi Smith

United States Patent Office.

LEVI SMITH, OF TIDIOUTE, PENNSYLVANIA.

DRIVE-PIPE AND COUPLING FOR OIL AND OTHER WELLS.

SPECIFICATION forming part of Letters Patent No. 255,469, dated March 28, 1882.

Application filed June 14, 1881. (No model.)

*To all whom it may concern:*

Be it known that I, LEVI SMITH, a citizen of the United States of America, residing at Tidioute, in the county of Warren and State of Pennsylvania, have invented certain new and useful Improvements in Drive-Pipes and Couplings for Oil and other Wells; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to provide a device for sinking the upper portion of an oil or other well down to a point where the drilling-tools are brought into use, and is designed as an improvement or modification of my Patent No. 237,621, of February 8, 1881; and to this end my present invention consists in certain details of construction, hereinafter more fully set forth, and pointed out in the claims.

Figure 1:
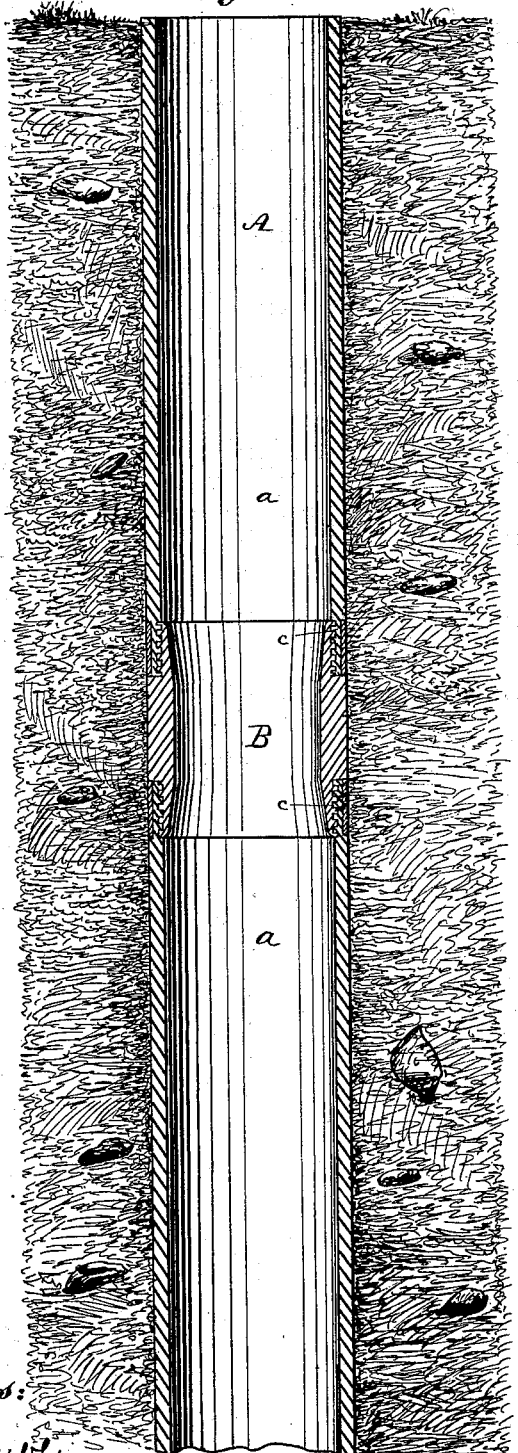
Figure 2:
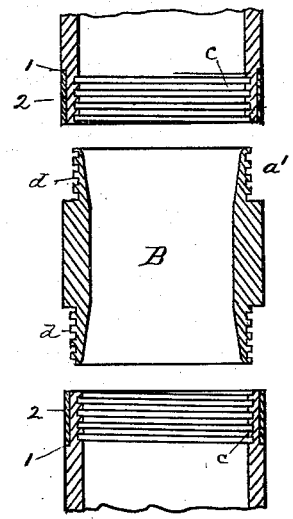
Figure 3:
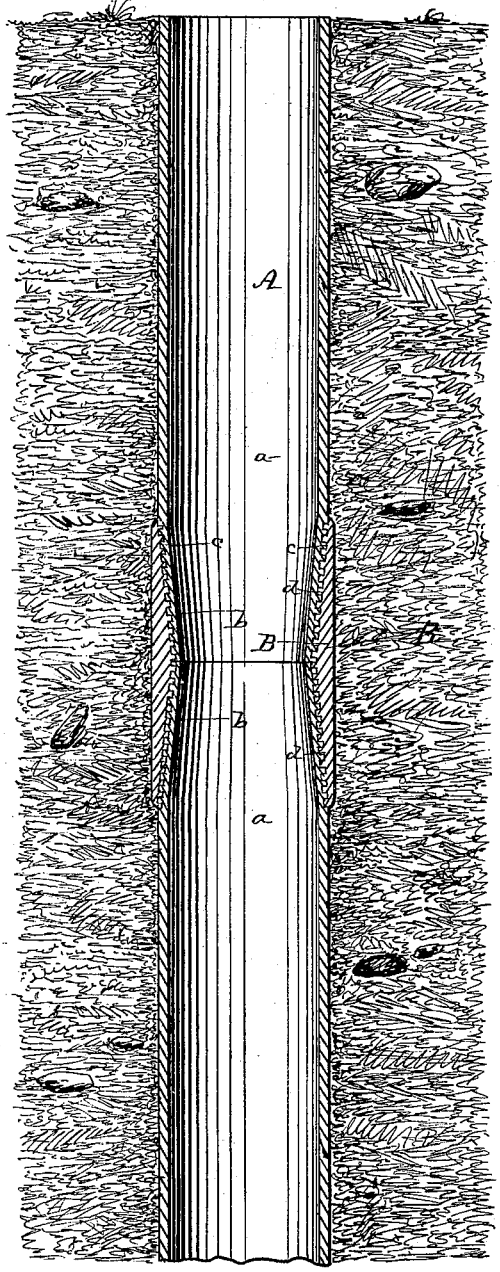
Figure 4:
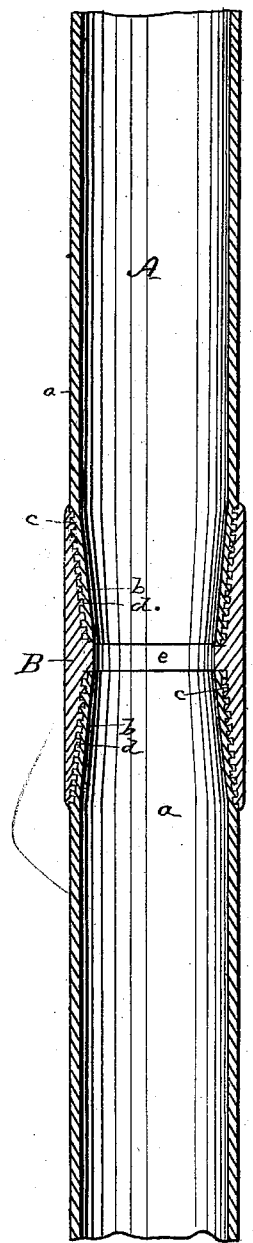

Referring to the drawings, Figure 1 is a sectional view of the driving pipe or tube. Fig. 2 is a detached view of the coupling-joint and pipes or tubes. Fig. 3 is a modification showing the ends of the pipe-sections contracted and fitting within the coupling-sections. Fig. 4 is a modification of Fig. 5, showing an internal flange in the coupling-section, against which the contracted ends of the pipe-sections abut.

A designates a driving pipe or tube, composed of any desired or required number of sections *a a*, made of steel or other suitable metal which will withstand the blows of the maul or hammer used in driving the same without bending or breaking. The maul or hammer I prefer to use in driving the pipe or tube is the one described in my patent above referred to. The ends of the pipe or tube sections *a* are screw-threaded internally with square screw-threads *c c* for a short distance, so as to be screwed over the ends of the coupling-joints or sections B. The coupling joints or sections B are at their greatest diameter of practically the same size as the external diameter of the pipe-sections, and have their ends cut away, as at *a'*, the cut-away portions being provided with square screw-threads *d d* on their exterior surfaces to match or take into the square screw-threads in the interior of the sections *a a*.

The shoulders on the coupling-joints, against which the ends of the sections *a* abut, may be plain or grooved to receive the ends of said sections to prevent the sections from telescoping or sliding the one within the other. The interior of the couplings is also beveled, as shown in Figs. 1 and 2, so as to allow the insertion, withdrawal, and free use of drilling or other tools used in the drilling or boring of the well.

The foregoing description is essentially the same as in my patent above referred to, except the square screw-threads in the pipe or tube sections and on the coupling-joints.

As a further safeguard against the telescoping of the sections, and to prevent the ends of the sections *a* from splitting, especially where the grain of the metal runs in the direction of the length of the tubes, I cut away a portion of the external surface of the tubes, as at 1, to receive the band or ring of metal 2, which is swaged or otherwise put on, so as to make a reliable joint. By strengthening the tubes at the ends by means of the band or ring of metal, and by providing the insides of the ends with square screw-threads, I greatly strengthen the tubes at this point and lessen the danger of the parts telescoping or getting out of line.

In Figs. 3 and 4 I have shown modifications in construction which I consider within the limits of my invention, and which I will now proceed to describe.

The ends of the pipe-sections *a a*, instead of being straight, are contracted or reduced in size, as shown at *b b*, and are provided on the external surface of the contracted or reduced part with square screw-threads *c c*, into which corresponding square screw-threads of the coupling-sections mesh and form a safe and reliable joint or point of union.

B B are the short coupling-sections, having double-inclined internal surfaces, in which are cut the square screw-threads *d d*, which are of the same pitch or thread as the threads *e e*, and when brought together and screwed up tight form a strong and firm coupling for the driving-pipe sections.

The screw-threads on one of the ends of the straight or contracted tubes or pipes, and also on one end of the coupling-sections, may be a right-handed thread, while on the other ends of these sections a left-handed thread may be cut; or I may make the threads in each and every instance either right or left handed, as is most convenient or desirable.

In Fig. 4 I have shown still another modification of my coupling-section, in which said section is provided with a central internal flange or rib, e, against which the ends of the sections a a abut when properly screwed together.

The rib e may be provided with a groove or recess on its upper and lower sides to receive and hold in place the ends of the pipe-sections, and in this way provide against the telescoping of the sections.

For general purposes I prefer to make coupling-sections of the same diameter as the greatest diameter of the sections a a, so that the external surface of the tube A will be plain or smooth and free from projections, which would tend to retard the passage of the tube into and from the earth, and this I accomplish by either of the forms of couplings shown and described. I may find it convenient and desirable, however, to make the coupling-sections flush, or of slightly greater diameter than the sections a a, so as to give greater strength to the coupling-sections, without departing from the spirit of my invention.

The use of the square screw-threads in the construction of drive-tubes I deem of great importance, as it gives a broader surface on which the shocks or blows from the driver are received and distributed and prevents the sections from telescoping, while by the ordinary sharp-edged screw-thread the beveled sides of the same have a tendency to facilitate the telescoping of the sections rather than to retard or prevent it.

I use the drive-pipes herein set forth in the same manner as the one described in my former patent—i. e., the tube A having been driven down to the rock strata, the interior thereof is cleared of all dirt by any of the well-known methods. The permanent casing is then lowered and placed therein with its lower end resting on the rock. The tube A is then withdrawn, and the boring or drilling of the well is then proceeded with in the usual manner.

I am aware that cylinders or tubes for Artesian wells have been made flush or on a line upon their exterior surfaces by means of wrought-iron hoops or bands shrunk upon the reduced ends of two cast-iron tubes to stop out the upper or poor water-veins and prevent the water from passing down to the good water found below.

I am also aware that wooden pipes for conveying water have had their ends connected by a uniting-band.

I am also aware that it is not broadly new to form square threads on the couplings of hose-pipe, &c.

Having thus described my invention, what I claim, and desire to secure by Letters Patent, is—

1. The drive pipe or tube herein described, composed of screw-threaded sections a a, said sections being strengthened at their ends by bands or rings set into said sections, over the screw-threads cut thereon, as shown and described, so as to be flush or of about the same external diameter as the sections.

2. The drive pipe or tube herein described for sinking oil and other wells, the same consisting of the tube-sections provided with tapering or reduced ends having square screw-threads cut thereon, and the coupling-sections provided with like screw-threads, as set forth.

3. A drive-pipe for sinking oil and other wells, the sections of which are connected by couplings having square screw-threads cut therein, as set forth.

In testimony whereof I affix my signature in presence of two witnesses.

LEVI SMITH.

Witnesses:
M. G. CUSHING,
WILL KEMBLE.